United States Patent
Dooley et al.

(10) Patent No.: US 8,519,555 B2
(45) Date of Patent: Aug. 27, 2013

(54) COMBINATION LOW SPOOL GENERATOR AND RAM AIR TURBINE GENERATOR

(75) Inventors: Kevin Allan Dooley, Mississauga (CA); Audrey Cheng, Richmond Hill (CA); Jerzy Makuszewski, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 351 days.

(21) Appl. No.: 12/955,485

(22) Filed: Nov. 29, 2010

(65) Prior Publication Data

US 2012/0133150 A1     May 31, 2012

(51) Int. Cl.
F02G 1/00     (2006.01)
(52) U.S. Cl.
USPC ..................................................... 290/1 A
(58) Field of Classification Search
USPC ..................................................... 290/1 A
See application file for complete search history.

(56) References Cited

U.S. PATENT DOCUMENTS

| | | |
|---|---|---|
| 3,269,118 A | 8/1966 | Benedict et al. |
| 3,397,854 A | 8/1968 | Reyle |
| 3,633,360 A | 1/1972 | Kelley |
| 3,688,560 A | 9/1972 | Broman et al. |
| 3,786,696 A | 1/1974 | Aleem |
| 3,799,476 A | 3/1974 | Bouiller et al. |
| 3,830,056 A | 8/1974 | Willis, Jr. et al. |
| 3,907,386 A | 9/1975 | Kasmarik et al. |
| 4,062,185 A | 12/1977 | Snow |
| 4,062,186 A | 12/1977 | Snow et al. |
| 4,310,768 A | 1/1982 | Colley |
| 4,473,752 A | 9/1984 | Cronin |
| 4,566,269 A | 1/1986 | Gingras |
| 4,572,961 A | 2/1986 | Borger |
| 4,733,155 A | 3/1988 | Smith |
| 4,864,812 A | 9/1989 | Rodgers et al. |
| 4,900,231 A | 2/1990 | Kennedy |
| 4,912,921 A | 4/1990 | Rice et al. |
| 4,927,329 A | 5/1990 | Kliman et al. |
| 4,936,748 A | 6/1990 | Adamson et al. |
| 5,030,877 A | 7/1991 | Denk |
| 5,184,458 A | 2/1993 | Lampe et al. |
| 5,196,746 A | 3/1993 | McCabria |
| 5,309,029 A | 5/1994 | Gregory et al. |
| 5,349,814 A | 9/1994 | Ciokajlo et al. |
| 5,376,827 A | 12/1994 | Hines |
| 5,418,412 A | 5/1995 | Brucker |
| 5,440,184 A | 8/1995 | Samy et al. |
| 5,485,717 A | 1/1996 | Williams |
| 5,555,722 A | 9/1996 | Mehr-Ayin et al. |
| 5,581,168 A | 12/1996 | Rozman et al. |
| 5,602,437 A | 2/1997 | Shahamat et al. |

(Continued)

FOREIGN PATENT DOCUMENTS

| | | |
|---|---|---|
| EP | 0104921 | 4/1984 |
| EP | 1031717 | 8/2000 |

(Continued)

*Primary Examiner* — Joseph Waks
(74) *Attorney, Agent, or Firm* — Norton Rose Fulbright Canada LLP

(57) ABSTRACT

A power generating apparatus for use with an aircraft gas turbine engine has a low pressure spool assembly which includes an electrical generator. The electrical generator includes a generator stator supported on a stationary structure of the engine and a generator rotor rotatable around the generator stator and mounted to the low pressure spool assembly.

17 Claims, 3 Drawing Sheets

(56) References Cited

U.S. PATENT DOCUMENTS

| | | |
|---|---|---|
| 5,687,561 A | 11/1997 | Newton |
| 5,694,765 A | 12/1997 | Hield et al. |
| 5,813,630 A | 9/1998 | Williams |
| 5,845,483 A | 12/1998 | Petrowicz |
| 5,867,979 A | 2/1999 | Newton et al. |
| 5,899,411 A | 5/1999 | Latos et al. |
| 5,903,115 A | 5/1999 | Taylor |
| 5,939,800 A * | 8/1999 | Artinian et al. .......... 307/64 |
| 6,058,791 A | 5/2000 | Brunet |
| 6,142,418 A | 11/2000 | Weber et al. |
| 6,232,691 B1 | 5/2001 | Anderson |
| 6,247,668 B1 | 6/2001 | Reysa et al. |
| 6,258,004 B1 | 7/2001 | Johnston |
| 6,353,790 B1 | 3/2002 | Tsuzuki |
| 6,367,248 B1 | 4/2002 | Langston et al. |
| 6,467,725 B1 | 10/2002 | Coles et al. |
| 6,581,874 B2 | 6/2003 | Lemire et al. |
| 6,677,685 B2 | 1/2004 | Pfleger et al. |
| 6,729,140 B2 | 5/2004 | Care et al. |
| 6,729,575 B2 | 5/2004 | Bevilaqua |
| 6,778,414 B2 * | 8/2004 | Chang et al. .......... 363/67 |
| 6,825,640 B1 | 11/2004 | Hill et al. |
| 6,832,486 B2 | 12/2004 | Care et al. |
| 6,838,778 B1 | 1/2005 | Kandil et al. |
| 6,871,128 B2 | 3/2005 | Kouno et al. |
| 6,895,741 B2 | 5/2005 | Rago et al. |
| 6,914,344 B2 | 7/2005 | Franchet et al. |
| 6,965,183 B2 | 11/2005 | Dooley |
| 7,028,461 B2 | 4/2006 | Goi |
| 7,040,082 B2 | 5/2006 | Bouiller et al. |
| 7,077,631 B2 | 7/2006 | Eccles et al. |
| 7,262,539 B2 | 8/2007 | Dooley |
| 7,372,175 B2 | 5/2008 | Bouiller et al. |
| 7,439,713 B2 | 10/2008 | Dooley |
| 7,468,561 B2 | 12/2008 | Kern et al. |
| 7,514,810 B2 | 4/2009 | Kern et al. |
| 7,605,483 B2 * | 10/2009 | Kern et al. .......... 290/4 A |
| 7,622,817 B2 | 11/2009 | El-Refaie et al. |
| 7,687,927 B2 * | 3/2010 | Shander et al. .......... 290/7 |
| 7,690,186 B2 * | 4/2010 | Dooley .......... 60/39.511 |
| 7,802,757 B2 * | 9/2010 | Dooley et al. .......... 244/60 |
| 7,841,163 B2 * | 11/2010 | Welch et al. .......... 60/39.091 |
| 2001/0003108 A1 | 6/2001 | Goi et al. |
| 2004/0006994 A1 | 1/2004 | Walsh et al. |
| 2004/0098988 A1 | 5/2004 | Goi |
| 2004/0118128 A1 | 6/2004 | Bruno et al. |
| 2004/0129835 A1 | 7/2004 | Atkey et al. |
| 2005/0199766 A1 | 9/2005 | Knott et al. |
| 2006/0012180 A1 | 1/2006 | Hoppe et al. |
| 2006/0042252 A1 | 3/2006 | Derouineau |
| 2006/0137355 A1 | 6/2006 | Welch et al. |
| 2006/0168968 A1 | 8/2006 | Zielinski et al. |
| 2007/0022735 A1 | 2/2007 | Henry et al. |
| 2007/0101721 A1 | 5/2007 | Dooley et al. |
| 2007/0265761 A1 | 11/2007 | Dooley et al. |
| 2009/0026770 A1 | 1/2009 | Huntemann |
| 2010/0143100 A1 * | 6/2010 | Sharp .......... 415/170.1 |
| 2010/0251726 A1 * | 10/2010 | Jones et al. .......... 60/773 |
| 2010/0327109 A1 | 12/2010 | Dooley et al. |
| 2011/0036093 A1 * | 2/2011 | Dooley .......... 60/772 |
| 2012/0000204 A1 * | 1/2012 | Kesseli et al. .......... 60/778 |
| 2012/0221157 A1 * | 8/2012 | Finney et al. .......... 700/287 |

FOREIGN PATENT DOCUMENTS

| | | |
|---|---|---|
| EP | 1031717 A2 | 8/2000 |
| EP | 1031717 A3 | 8/2000 |
| EP | 1106870 | 9/2005 |
| EP | 1251294 A2 | 3/2006 |
| EP | 1251294 A3 | 3/2006 |
| EP | 1359299 | 4/2006 |
| EP | 1764908 | 3/2007 |
| EP | 2004489 B1 | 11/2010 |
| GB | 1041587 | 9/1966 |
| GB | 1147730 | 4/1969 |
| GB | 1174969 | 12/1969 |
| GB | 2220038 | 12/1989 |
| GB | 2402450 | 12/2004 |
| WO | 2005021949 | 3/2005 |
| WO | 2005054645 | 6/2005 |
| WO | 2006084437 | 8/2006 |

* cited by examiner

COMBINATION LOW SPOOL GENERATOR AND RAM AIR TURBINE GENERATOR

TECHNICAL FIELD

The described subject matter relates generally to an aircraft electric power generating apparatus and, more particularly, to the combination of a low pressure spool generator and a ram air turbine generator for use with an aircraft gas turbine engine having a fan assembly.

BACKGROUND OF THE ART

An emergency power source is required for control of flight surfaces in the event of a total loss of engine power during flight. In large aircraft, a ram air turbine (RAT) is deployed to drive an emergency generator. However, the RAT adds cost and weight, and since it is rarely if ever used, its reliability should it be needed is not easily ascertained other than by periodic deployment for test purposes. In smaller aircraft, emergency batteries are provided, which also add cost and weight. U.S. Pat. Nos. 5,867,979, 6,467,725, 6,614,142 and 7,468,561 theorize that a generator mounted on the low spool of the gas turbine engine may provide an alternative to having an aircraft RAT or other supplemental power source, however the difficulty to overcome is how to generate a useful power output from a low spool generator both at regular operations speeds as well as at the relatively low rotational speed experienced during engine windmilling (free rotation of the fan, propeller, etc. effected by ram air on the inoperative engine). U.S. Pat. No. 6,467,725 proposes a step-up gearbox, which of course adds weight, cost and complexity, and requires space. Accordingly, there is a need for improvement in emergency power generation available to aircraft.

SUMMARY

In one aspect, the described subject matter provides a power generating apparatus comprising an aircraft gas turbine engine having a low pressure compressor assembly including a bladed propulsor rotatable in response to ram air passing through the engine, an electrical generator including a generator stator and a generator rotor, and a power conditioning apparatus, the generator rotor connected to a rotor disc of the low pressure compressor assembly for rotation with the bladed propulsor, the power conditioning apparatus providing first and second electrical outputs, the first having a higher voltage than the second.

In another aspect, the described subject matter provides an electric power generating apparatus for use with an aircraft gas turbine engine having a low pressure spool assembly including a low pressure compressor rotor disc mounted to a low pressure spool shaft and a plurality of blades radially extending from the rotor disc, the blades being rotatable within an annular section of a main fluid path of the engine for driving an air flow to pass through the section of the main fluid path during engine operation, the electrical power generating apparatus comprising a generator stator supported on a stationary structure and a generator rotor rotatable around the generator stator and mounted to the low pressure spool assembly, the generator rotor being radially positioned closer to an inner annular wall of the section of the main fluid path than with respect to the low pressure spool shaft.

In a further aspect, the described subject matter provides a method of generating power on an aircraft, the method comprising the steps of operating a gas turbine engine to drive an electric generator assembly, providing a first electric power output from the generator assembly, providing a second electric power output from the generator assembly, wherein the first power output is at higher voltage than the second power output, and using the second power output during an engine-inoperative condition to provide power to the aircraft.

Further details of these and other aspects will be apparent from the detailed description and figures included below.

DESCRIPTION OF THE DRAWINGS

Reference is now made to the accompanying figures depicting aspects of the described subject matter, in which.

DETAILED DESCRIPTION OF THE PREFERRED EMBODIMENTS

Figure 1:
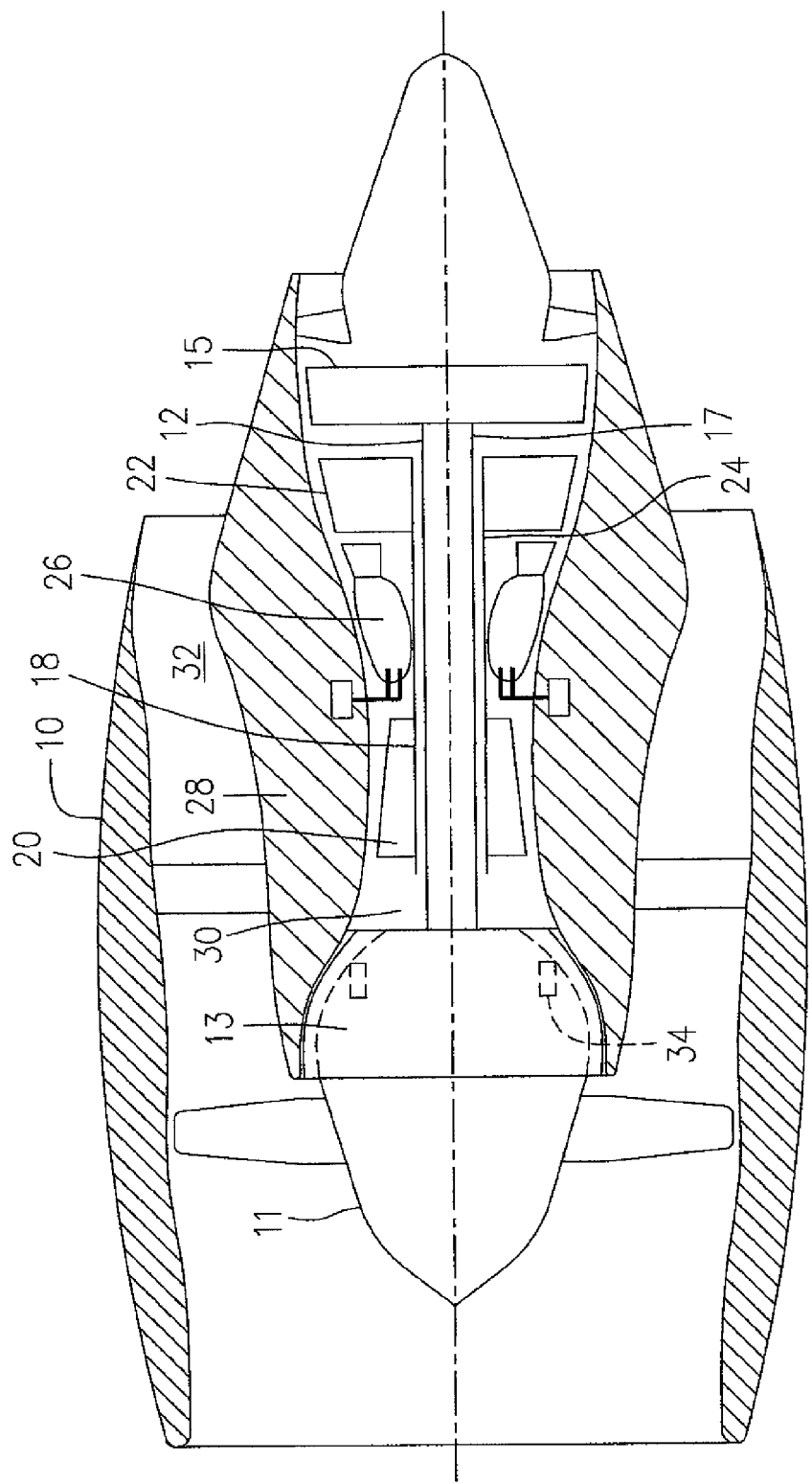
FIG. 1 is a schematic illustration of a turbofan engine in a cross-sectional view, illustrating one embodiment.

FIG. 1 schematically illustrates a turbofan engine which as an example, illustrates the application of the described subject matter. The turbofan engine of FIG. 1 includes a housing or nacelle 10, a low pressure spool assembly seen generally at 12 which includes a fan assembly 11, a low pressure compressor assembly 13, a low pressure turbine assembly 15 and a low pressure spool shaft 17 connecting the low pressure compressor assembly 13 with the low pressure turbine assembly 15, a high pressure spool assembly seen generally at 18 which includes a high pressure compressor assembly 20, a high pressure turbine assembly 22 and high pressure spool shaft 24 connecting the high pressure compressor assembly 20 with the high pressure turbine assembly 22. The engine further comprises a combustor seen generally at 26.

An engine core casing 28 is provided to support the low pressure and high pressure spool assemblies 12 and 18, thereby defining an annular main fluid path 30 of the engine extending axially therethrough, and an annular bypass duct 32 between the nacelle 10 and the engine core casing 28. An electric generator 34, according to one embodiment, is associated with the low pressure spool assembly 12 to extract mechanical power generated by the low pressure turbine assembly 22 during normal engine operation and to extract the mechanical power from a windmill action of the fan assembly 11 during an emergency situation in which the engine is out of operation. The fan assembly 11 is connected and rotates together with the low pressure compressor assembly 13.

Figure 2:
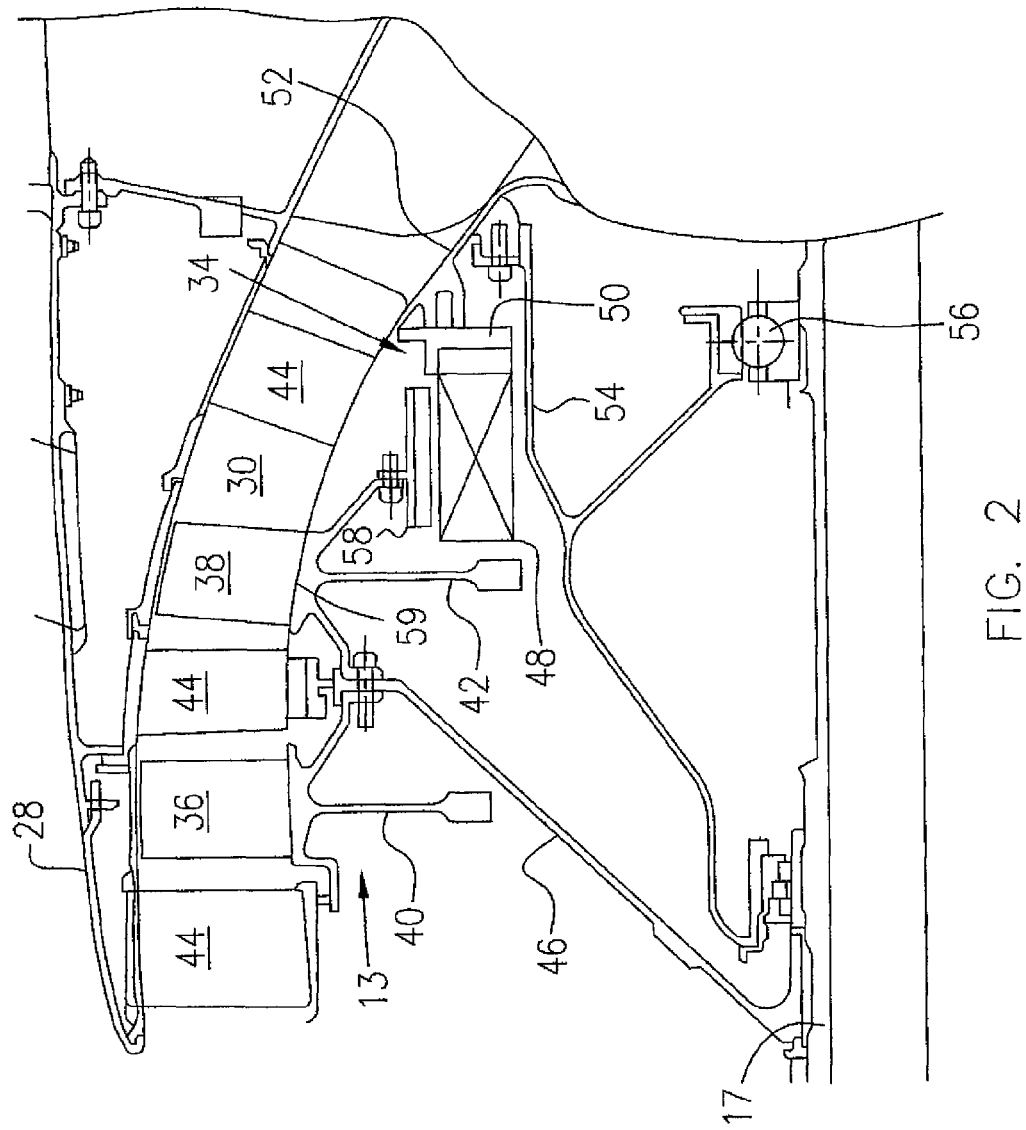
FIG. 2 is a partial cross-sectional view of the engine of FIG. 1 in an enlarged scale.

Referring to FIGS. 1 and 2, the low pressure compressor assembly 13 is located within the core casing 28 and for example, according to this embodiment, may include first and second circumferential arrays of rotor blades 36 and 38 radially extending from first and second rotor discs 40 and 42 into an annular section of the main fluid path 30 of the engine. The first and second circumferential arrays of rotor blades 36, 38 are positioned within the annular section of the main fluid path 30 of the engine between axially spaced adjacent stator vanes 44.

The first and second rotor discs 40 and 42 for example, may be connected to a rotor plate 46 which is mounted to the low pressure spool shaft 17 to rotate together therewith. During normal engine operation the low pressure spool shaft 17 transmits torque created by the low pressure turbine assembly 15 to the rotor plate 46 in order to drive the rotor blades 36 and 38 in rotation, thereby compressing and directing an air flow to pass through the annular section of the main fluid path 30 of the engine towards the high pressure compressor assembly 20 for further compression.

The electric generator 34 includes a generator stator 48 having at least one electrical winding (not shown) supported on a stationary structure, for example being mounted by one or more brackets 50 to an inner wall 52 of the annular section of the main fluid path 30 of the engine. The inner wall 52 of the annular section of the main fluid path 30 may be supported on a bearing housing 54 which accommodates bearing 56 supported on the low pressure spool shaft 17. The electric generator 34 also includes a generator rotor 58 having at least one permanent magnet mounted to the low pressure spool assembly 12, for example the second rotor disc 42 of the low pressure compressor assembly 13. The generator rotor 58 is radially outwardly spaced apart from, but adjacent to the generator stator 48. Therefore, the generator rotor 58 is rotatable around the generator stator 48, together with the rotor disc 42 of the low pressure compressor assembly 13.

In accordance with one embodiment, the generator stator may thus be formed in a ring structure having a plurality of stator windings. The generator rotor 58 may include a plurality of permanent magnets positioned in a circumferential array around the generator stator 48. The generator 34 may be provided in accordance with the applicant's U.S. Pat. No. 6,965,183, the entire contents of which are incorporated herein by reference.

In order to have a relatively large rotational radius, the generator rotor 58 may be connected to an outer peripheral rim 59 of the rotor disc 42 such that the generator rotor 58 is radially positioned closer to the inner wall 52 of the annular section of the main fluid path 30 of the engine than with respect to the low pressure spool shaft 17. The generator 34 is, in this example, mounted radially outwardly of the bearing 56, and an inside diameter of the stator 48 is greater than an outside diameter of the bearing 56. The inside diameter of the stator 48 is also, in this example, greater than an inside diameter of the rotor disc 42. The generator in this example also comprises a relatively thin rotor which is mounted outside of the stator. As mentioned, the generator 34 is, as such, located closer to the gas path 30 than to the shaft 17, and as such has a radius adapted to provide a high peripheral (tangential) speed, for a given rotational speed, relative to a smaller-radius generator mounted to the same shaft. Hence, generator 34 is configured to provide improved power output at windmilling speeds by virtue of the relatively large radius of the generator rotor 58, without the need for step-up gearing or other mechanical speed multiplication.

The generator 34 which has the generator rotor rotating with a relatively large radius, is thereby capable of increased generating capacity without use of speed increasing means such as a step-up gearbox.

Figure 3:
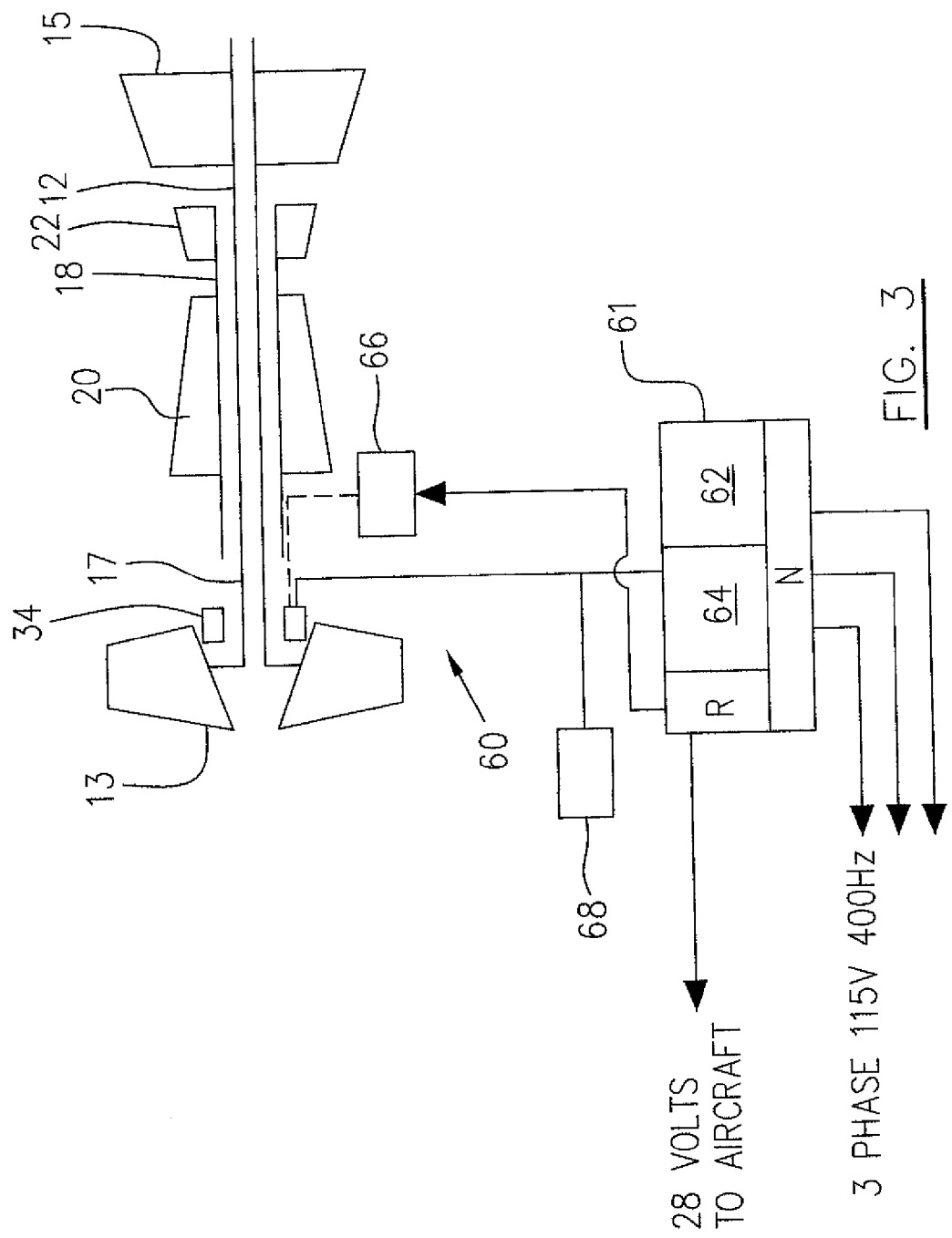
FIG. 3 is a schematic illustration of an electrical power generating apparatus based on the low pressure spool generator shown in FIG. 2.

Referring to FIG. 3, a power generating apparatus 60, based on the generator 34 as described above with reference to FIGS. 1 and 2 which will not be repeated herein, is provided according to another embodiment.

The apparatus 60 may further include an inverter/converter unit 62 configured to provide, in conjunction with the generator 34, a first output providing alternating current (AC) power to the engine and aircraft during normal engine operation (e.g. take-off, cruise, approach, etc.). The output of the inverter 62 may be any desired output; in this example, three-phase 115 volts, 400 Hz AC current is provided. The apparatus 60 may further include a rectifier unit 64 in conjunction with the generator 34 to provide a second output for use in emergency windmilling situations; in this example direct current (DC) power at a low (or at least lower) voltage, for example 28 volts DC is provided. It is understood that aircraft electronics, such as aircraft controls and other cockpit avionics, typically operate on a 28V DC input.

The inverter/converter unit 62 and rectifier unit 64 may be provide as functions of a single set of electronics, or as separate devices, or in any other suitable manner.

The inverter unit 62 may be provided in accordance with the applicant's U.S. Pat. No. 7,439,713, the entire contents of which are incorporated herein by reference.

A controller 61 associated with the inverter/converter unit 62 and the rectifier 64 may select an power output mode, between a normal engine operation mode (indicated by letter N in FIG. 3) and a ram air turbine (RAT) mode (indicated by letter R in FIG. 3), depending on an operational state of the engine. During normal engine operation, the power generating apparatus 60 provides in the output mode N, in this example 115V, 400 Hz AC power to the engine/aircraft from the flight idle speed up to take-off speed. The generator may in fact produce power at different voltage and/or frequency which is then regulated by the inverter/converter unit prior to delivery to the power network. During an emergency situation in which all engines of the aircraft are out of operation, for example, the power generating apparatus 60 provides in the output mode R, in this example 28 volts DC power using the windmill action of the fan assembly 11 as the source of mechanical power to drive the regulated permanent magnetic generator 34 in conjunction with the rectifier unit 64. (It will be understood that the 28 VDC output may also be available for use during normal engine operation). Suitable logic may be provided within the controller 61, or elsewhere, to switch outputs or modes as desired or required, based on a sensed data indicative of an engine-out situation requiring emergency power.

The controller 61 may activate an emergency power generation mode, which for example activates the second output, in response to a suitable signal indicative of an emergency situation requiring emergency power. While numerous such signals are possible, one example signal may be generated upon the occurrence of a flame-out of all aircraft engines, weight-on-wheel is "off", and the engine fan speed (N1) drops below a selected threshold. (It will be understood that N1 speed may be measured directly from the generator rotor speed.) Another possible signal may be manually generated from the cockpit. Many others are possible.

Although windmilling speeds are a function of many factors, such as engine configuration, air speed, and so on, it is understood that the rotational speed range of the fan/propulsor when windmilling is only a small fraction of the normal engine operating speed range, and hence the power available from the generator when driven at windmilling speeds is only a fraction of the normal operational output range of the generator. Nevertheless, using a suitable power regulation technique, such as the one described above, the generator may be suitably regulated to provide a useful emergency power source under windmilling conditions without the use of step-up gearing or other speed multipliers. Hence, the present approach offers an emergency power solution for the aircraft.

The apparatus 60 may further provide electrical power to drive such accessories or equipment as may be needed during operation in RAT mode. For example, where generator 34 is oil-cooled, an electric oil pump 66 which pumps cooling oil in order to cool the windings and stator assembly in the generator 34.

In contrast to a conventional RAT generator which is not in operation until an emergency situation occurs, the generator 34 is tested continuously because it is the same generator used for both normal engine operation and in emergency situations. Furthermore, the AC power output frequency of the generator 34 before being regulated, is proportional to the N1 speed (the low pressure spool rotational speed) and can be used to measure the N1 speed, thereby eliminating the need for an N1 probe system. For example, a display or rating device 68 associated with the power generating apparatus 60 may be used to show or indicate the N1 speed as a result of a calibration of the AC power output frequency of the generator 34.

The above description is meant to be exemplary only, and one skilled in the art will recognize that changes may be made to the embodiments described without departure from the scope of the described subject matter. For example, the generator may be of any suitable architecture and placed in any suitable location with any suitable mounting arrangement within the engine. The generator may be positioned and affixed to the fan rotor itself, the rotor disc of a stage of the low pressure compressor assembly, directly to the low pressure shaft, or other suitable area of the low pressure spool assembly. The power electronics may be any suitable. The first and second outputs may be provided through common output terminals or in any suitable manner. Additional outputs may further be provided, if desired. The first (normal) output may be in any form desired, such as fixed frequency AC, variable frequency AC, DC, etc. The described subject matter may also be applied to an aircraft engine having propellers or other bladed propulsor. Still other modifications which fall within the spirit of the described subject matter will be apparent to those skilled in the art, in light of a review of this disclosure, and such modifications are intended to fall within the scope of the appended claims.

The invention claimed is:

1. A power generating apparatus comprising an aircraft gas turbine engine having a low pressure compressor assembly including a bladed propulsor rotatable in response to ram air passing through the engine, an electrical generator including a generator stator and a generator rotor, and a power conditioning apparatus, the power conditioning apparatus providing first and second electrical outputs, the first having a higher voltage than the second, the generator rotor connected to a rotor disc of the low pressure compressor assembly for rotation with the bladed propulsor, wherein the generator rotor is radially positioned closer to an inner wall of an annular section of a main fluid path of the engine with respect to a shaft of the low pressure compressor assembly, the annular section of the main fluid path directing an air flow compressed by the low pressure compressor assembly.

2. The power generating apparatus as defined in claim 1 further comprising a controller configured to sense a signal indicative of an emergency condition, and in response thereto adjust a power output state of the power conditioning apparatus.

3. The power generating apparatus as defined in claim 2, wherein the controller activates the second electrical output in response to the signal.

4. The power generating apparatus as defined in claim 1 wherein the second output is configured to provide direct current in use and the first output is configured to provide alternating current in use.

5. The power generating apparatus as defined in claim 1 wherein the generator rotor is connected to an outer peripheral rim of the rotor disc of the low pressure compressor assembly.

6. The power generating apparatus as defined in claim 1 wherein the generator rotor is mounted for rotation radially outwardly of the generator stator.

7. The power generating apparatus as defined in claim 1 wherein the power conditioning apparatus comprises an inverter/converter unit configured to receive electrical output of the electric generator and to provide alternating current (AC) power during normal engine operation.

8. The power generating apparatus as defined in claim 1 wherein the power conditioning apparatus comprises a rectifier unit configured to receive electrical output of the electrical generator and to provide direct current (DC) power under a windmill condition of the engine.

9. The power generating apparatus as defined in claim 1 wherein the generator stator is mounted on an inner wall of an annular section of a main fluid path of the engine, the annular section of the main fluid path directing an air flow compressed by the low pressure compressor assembly during engine operation.

10. An electric power generating apparatus for use with an aircraft gas turbine engine having a low pressure spool assembly including a low pressure compressor rotor disc mounted to a low pressure spool shaft and a plurality of blades radially extending from the rotor disc, the blades being rotatable within an annular section of a main fluid path of the engine for driving an air flow to pass through the section of the main fluid path during engine operation, the electrical power generating apparatus comprising a generator stator supported on a stationary structure and a generator rotor rotatable around the generator stator and mounted to the low pressure spool assembly, the generator rotor being radially positioned closer to an inner annular wall of the section of the main fluid path than with respect to the low pressure spool shaft.

11. The electric power generating apparatus as defined in claim 10 wherein the generator rotor comprises at least one permanent magnet and wherein the generator stator comprises at least one electrical winding.

12. The electric power generating apparatus as defined in claim 10 comprising a controller for selecting an electrical power output mode for between an engine operation mode to provide AC power and a ram air turbine (RAT) mode to provide DC power.

13. The electric power generating apparatus as defined in claim 10 comprising an inverter/converter unit.

14. The electric power generating apparatus as defined in claim 10 comprising a rectifier.

15. A method of generating power on an aircraft, using an electric generator assembly associated with a low pressure compressor assembly of a gas turbine engine, the method comprising the steps of operating the gas turbine engine to drive the electric generator assembly to thereby provide a first electric power output from the electric generator assembly during normal engine operation, driving the generator assembly by a windmill action of the low pressure compressor assembly to thereby provide a second electric power output form the electric generator assembly during an engine-inoperative condition to provide power to the aircraft.

16. The method of claim 15 further comprising monitoring an operational status of the engine, and then activating the second power output upon determining the presence of the engine-inoperative condition.

17. The method of claim 15 wherein the step of providing a second power output includes providing a low voltage direct current output.

* * * * *